US012177127B2

United States Patent
Mishra et al.

(10) Patent No.: US 12,177,127 B2
(45) Date of Patent: *Dec. 24, 2024

(54) METHOD AND APPARATUS FOR USER PLANE RESOURCE SELECTION FOR 5G CORE

(71) Applicant: Mavenir Networks, Inc., Richardson, TX (US)

(72) Inventors: Abhishek Mishra, Bangalore (IN); Vipin Padlikar, Bangalore (IN); Tamanna Jindal, McKinney, TX (US)

(73) Assignee: Mavenir Networks, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,384

(22) Filed: Sep. 25, 2023

(65) Prior Publication Data

US 2024/0022516 A1    Jan. 18, 2024

Related U.S. Application Data

(63) Continuation of application No. 17/351,893, filed on Jun. 18, 2021, now Pat. No. 11,805,059, which is a (Continued)

(51) Int. Cl.
*H04L 47/00* (2022.01)
*H04L 47/17* (2022.01)
(Continued)

(52) U.S. Cl.
CPC ............... *H04L 47/17* (2013.01); *H04W 8/04* (2013.01); *H04W 28/0215* (2013.01)

(58) Field of Classification Search
None
See application file for complete search history.

(56) References Cited

U.S. PATENT DOCUMENTS 10,785,693 B2   9/2020   Sun et al.
11,277,479 B2   3/2022   Zhu et al.
(Continued)

FOREIGN PATENT DOCUMENTS

WO   2017074495 A1   5/2017
WO   2017200978 A1   11/2017
(Continued)

OTHER PUBLICATIONS

Extended European Search Report for corresponding European Application EP20738169.0, 10 pages, dated Sep. 5, 2022.
(Continued)

*Primary Examiner* — Gerald A Smarth
(74) *Attorney, Agent, or Firm* — Ruggiero McAllister & McMahon LLC

(57) ABSTRACT

A User Plane Function (UPF) of 5G Core network performs a search for the next hop in the data path, using utilities (e.g., Internet Control Message Protocol (ICMP) trace route), and determines the capability of the next router and/or other hops in the path. The UPF updates (e.g., using the PATCH command) the Network Repository Function (NRF) with the gathered information. The UPF also updates the NRF the UPF's position in the current route, and the role(s) the UPF is playing at a given time, e.g., Branching Point (BP), Intermediate User Plane Function (I-UPF), and the like. The SMF is enabled to identify the UPF's capability for a given PDU Session. The selection of a given UPF for non-suitable roles can be prevented, and the UPF can be selected for those roles in which the UPF is more suitable at a given time.

10 Claims, 9 Drawing Sheets

Related U.S. Application Data continuation of application No. PCT/US2020/012509, filed on Jan. 7, 2020.

(60) Provisional application No. 62/789,794, filed on Jan. 8, 2019.

(51) Int. Cl.
  *H04W 8/04*      (2009.01)
  *H04W 28/02*     (2009.01)

(56) References Cited

U.S. PATENT DOCUMENTS

| | | |
|---|---|---|
| 2012/0004494 A1 | 2/2012 | Velev et al. |
| 2014/0030757 A1 | 10/2014 | Park et al. |
| 2014/0034813 A1 | 11/2014 | Kaippallimalil et al. |
| 2018/0054832 A1* | 2/2018 | Luo ................... H04L 45/16 |
| 2018/0022774 A1 | 8/2018 | Faccin et al. |
| 2018/0227743 A1 | 8/2018 | Faccin et al. |
| 2019/0007500 A1 | 1/2019 | Kim et al. |
| 2019/0059067 A1 | 2/2019 | Lee et al. |
| 2019/0191467 A1 | 6/2019 | Dao et al. |
| 2019/0261260 A1* | 8/2019 | Dao ................... H04W 48/00 |
| 2021/0083965 A1* | 3/2021 | Taft ................... H04L 1/0016 |

FOREIGN PATENT DOCUMENTS

| | | | |
|---|---|---|---|
| WO | 2018068738 A1 | 4/2018 | |
| WO | WO-2019092059 A1 * | 5/2019 | |
| WO | WO-2020256688 A1 * | 12/2020 | ......... H04L 12/1407 |

OTHER PUBLICATIONS

Huawei et al: "TS 23.501: UPF Selection based on SMF Local Information", 3GPP Draft; S2-178136 WAS8113 PCR-23501_UPF SELECTION_R3, 3rd Generation Partnership Project (3GPP), Mobile Competence Centre; 650, Route Des Lucioles; F-06921 Sophia-Antipolis Cedex; France; vol. SA WG2, No. Ljubljana, Slovenia; Oct. 23, 2017-Oct. 27, 2017; Oct. 27, 2017 (Oct. 27, 2017), XP051348025, Retrieved from the Internet: URL:http://www.3gpp.org/ftp/Meetings_3GPP_ SYNC/SA2/Docs/[retrieved on Oct. 27, 2017].

Dusia Ayush et al: "Control Communication in SON-based Dynamic Multi-hop Wireless Infrastructure-less Networks", 2018 IEEE International Conference on Advanced Networks and Telecommunications Systems (ANTS), IEEE, Dec. 16, 2018 (Dec. 16, 2018), pp. 1-6, XP033547156.

International Preliminary Report on Patentability for corresponding international application PCT/US2020/12509, 5 pages, dated Apr. 9, 2020.

ETSI. "5G; System Architecture for the 5G System," 3GPP TS 23.501 version 15.3.0 Release 15, [retrieved on Mar. 14, 2020). Retrieved from the Internet: < URL: df> pp. 1-99.

International Search Report for corresponding international application PCT/US2020/12509, 2 pages, dated Apr. 9, 2020.

Written Opinion for corresponding international application PCT/US2020/12509, 4 pages, dated Apr. 9, 2020.

* cited by examiner

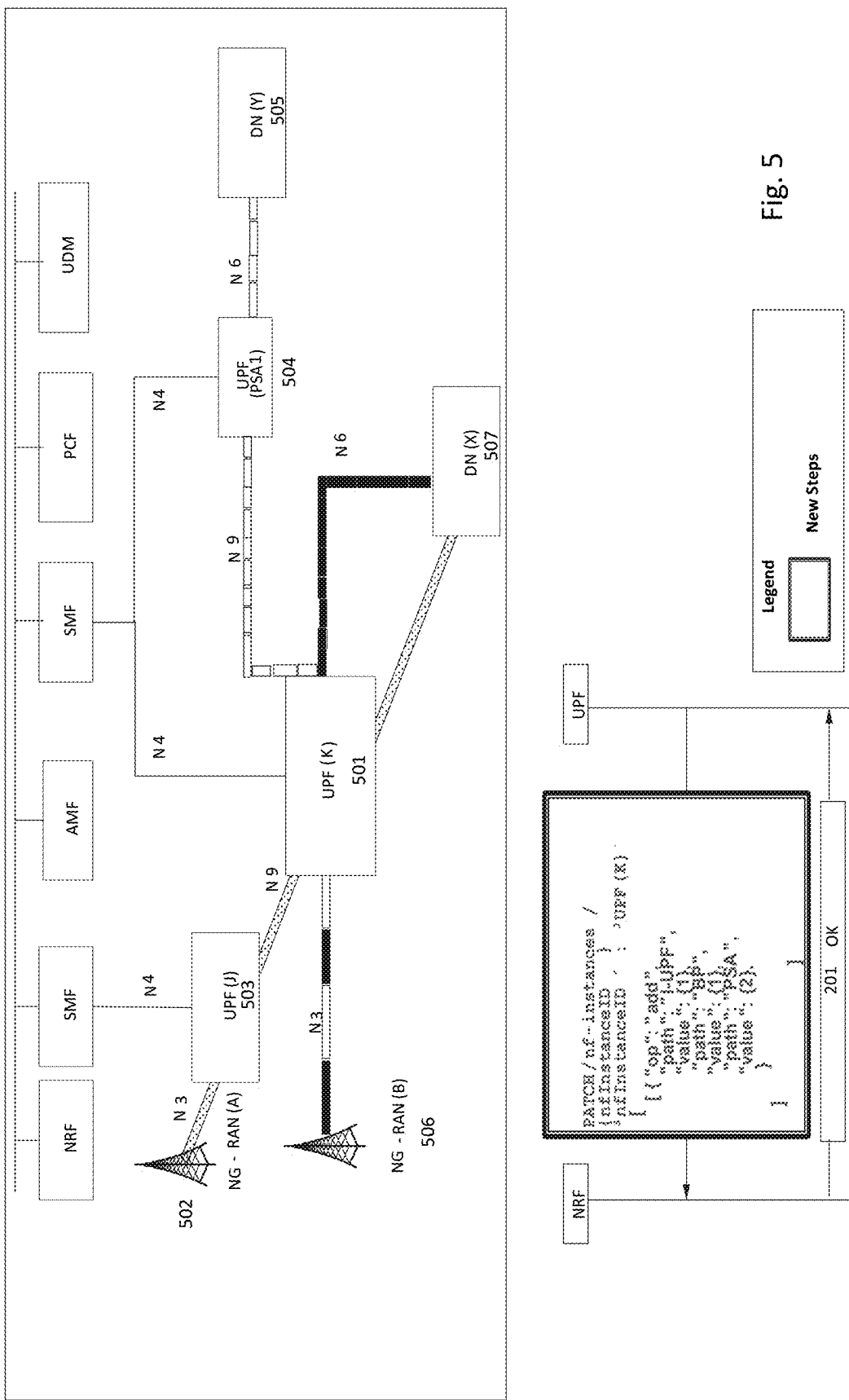

METHOD AND APPARATUS FOR USER PLANE RESOURCE SELECTION FOR 5G CORE

CROSS REFERENCE TO RELATED APPLICATIONS

The present application is a continuation application of U.S. patent application Ser. No. 17/351,893 filed Jun. 18, 2021, which is a continuation application of International (PCT) application No. PCT/US2020/012509 filed Jan. 7, 2020 which claims priority to U.S. Provisional Patent Application No. 62/789,794, filed on Jan. 8, 2019, all of which are incorporated herein by reference in their entireties.

BACKGROUND OF THE DISCLOSURE

1. Field of the Disclosure

The present disclosure relates to a mobile communication network operation, and relates more particularly to a method and an apparatus for optimizing User Plane resource analysis and selection, e.g., for 5G Core network operation or operation of other types of mobile networks handling user data transmission.

2. Related Art

5G Core (5GC) has defined network function (NF) and architecture that support service-based architecture (SBA). FIG. 1 shows an example embodiment of the service-based architecture, which includes: User Plane Function (UPF) module 101; Network Repository Function (NRF) module 102 (e.g., utilizing associated interface Nnrf); Data Network (DN) 103; User Equipment (UE) 104; Radio Access Network (RAN) 105; Authentication Server Function (AUSF) module 106 (e.g., utilizing associated interface Nausf); Access and Mobility Management Function (AMF) module 107 (e.g., utilizing associated interface Namf); Application Function (AF) module 108 (e.g., utilizing associated interface Na); Network Exposure Function (NEF) module 109 (e.g., utilizing associated interface Nnef); Network Slice Selection Function (NSSF) module 110 (e.g., utilizing associated interface Nnssf); Policy Control Function (PCF) module 111 (e.g., utilizing associated interface Npcf); Session Management Function (SMF) module 112 (e.g., utilizing associated interface Nsmf); and Unified Data Management (UDM) module 113 (e.g., utilizing associated interface Nudm). The above-mentioned NFs (e.g., UPF, NRF, SMF, etc.) can be implemented, e.g., as software programs executed by computer processors. Therefore, as used in the present disclosure, the various NFs are interchangeably referred to as network "functions" and/or network "function modules." Further detailed description of NRF and UPF modules are provided below.

NRF module can be a network entity that supports NF registration, NF discovery and Subscribe/Notification services. In an example embodiment, any NF can register with the NRF module by using the service-based interfaces. Any NF node can perform the discovery of another NF node by doing subscribe-and-receive-notification about the given NF node.

FIG. 2 shows the UPF module registering with the NRF module, using the Nnrf defined API (application programming interface) of the NRF. In the example embodiment shown in FIG. 2, the UPF module uses the PUT API call defined by Nnrf interface to register itself.

User Plane Function (UPF) (also referred to as Data Plane Function (DPF)) on 5G core is a network function, which is used for routing user plane traffic. Unlike other NF, UPF can offer one or more of different services to the user plane traffic, e.g., a Branching Point (BP), Uplink Classifier (ULCL), Anchor Point (e.g., Packet Data Unit Session Anchor (PSA)), Deep Packet Inspection (DPI) and/or Intermediate User Plane Function (I-UPF), which are merely examples and are not limiting. Branching Point refers to a common UPF at which the different user plane paths leading to the different PDU anchors branch out, and this common UPF is referred to as a UPF supporting the "Branching Point" functionality. Uplink Classifier (ULCL) function aims to direct network data traffic to local data networks based on traffic-matching-filters applied to the UE data traffic. I-UPF refers to an intermediate UPF that sits between two other UPFs. PSA is an UPF that anchors with the Data Network (DN). DPI is a functionality that performs the Layer 7 packet inspection, e.g., identifying a Skype™-like application.

Although one UPF can do multiple of these tasks in each deployment, there can be multiple UPFs doing these functionalities according to an example embodiment. The resource handling of the UPF offering a given service may be different from that of the UPF offering other services. For example, UPF in a given network topology can be located behind a router that offers Maximum Traffic Unit (MTU) that leads to packet fragmentations, in which case the UPF is not suitable for an I-UPF or PSA, but the UPF is suitable for a Branching point, as it can be positioned near to the RAN.

SUMMARY OF THE DISCLOSURE

A method and an apparatus for optimizing User Plane resource analysis and selection for 5G Core network operation and operation of other types of mobile networks, e.g., in a Long Term Evolution (LTE) network, as a Packet Data Network Gateway (PGW), or in a 3G network, as a Gateway GPRS Support Node (GGSN), are provided. By having the capabilities of the User Plane Functions (UPFs) (also referred to as Data Plane Functions (DPFs)) updated dynamically, a Session Management Function (SMF) is able to select a UPF that has appropriate capability level for a given Packet Data Unit (PDU) session.

In an exemplary embodiment, a User Plane Function (UPF) of 5G Core network performs a search for the next hop in the data path, using utilities (e.g., Internet Control Message Protocol (ICMP) traceroute), and determines the capability of the next router and/or other hops in the path. The UPF updates (e.g., using the PATCH command) the Network Repository Function (NRF) with the gathered information.

In another embodiment, the UPF also updates the NRF the UPF's position in the current route, and the role(s) the UPF is playing at a given time, e.g., Branching Point (BP), Intermediate User Plane Function (I-UPF), etc., and in this manner the SMF is enabled to identify the UPF's capability for a given PDU Session, and the selection of a given UPF for non-suitable roles can be prevented.

BRIEF DESCRIPTION OF THE DRAWINGS

FIG. 5 shows an example of UPF identifying its current capabilities and updating the NRF.

DETAILED DESCRIPTION OF THE EMBODIMENTS

Figure 1:
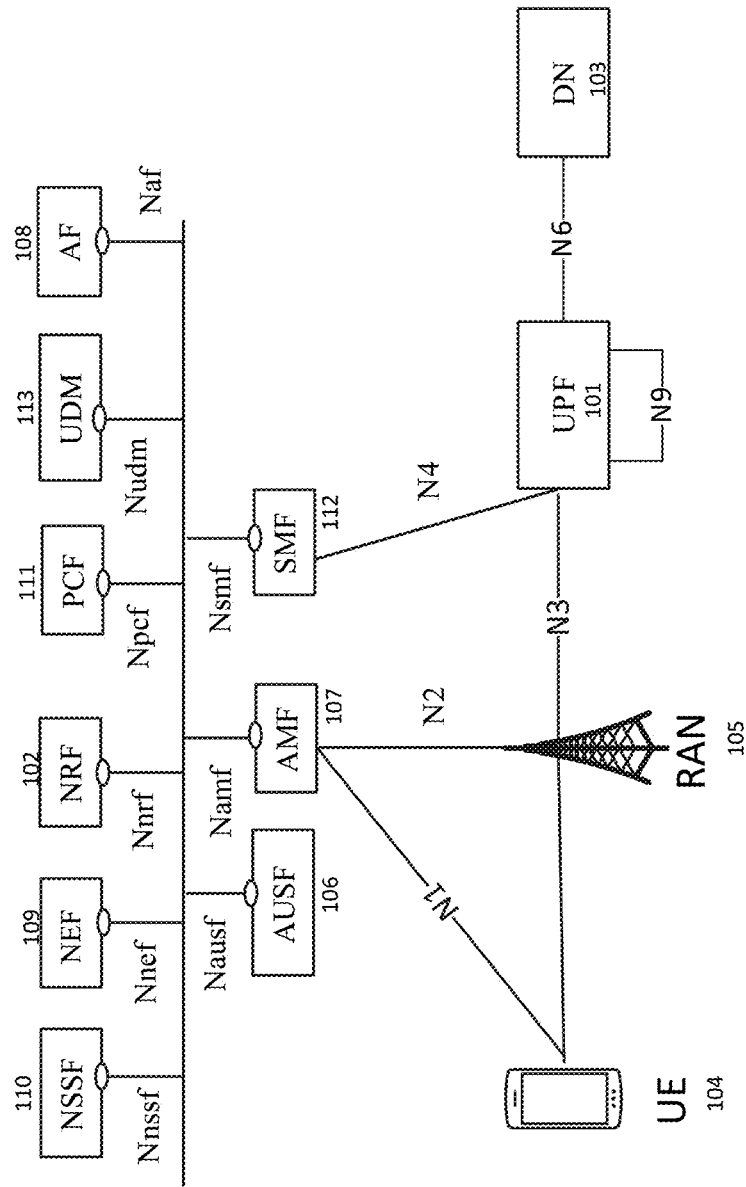
FIG. 1 shows an example of a service-based architecture.
Figure 2:
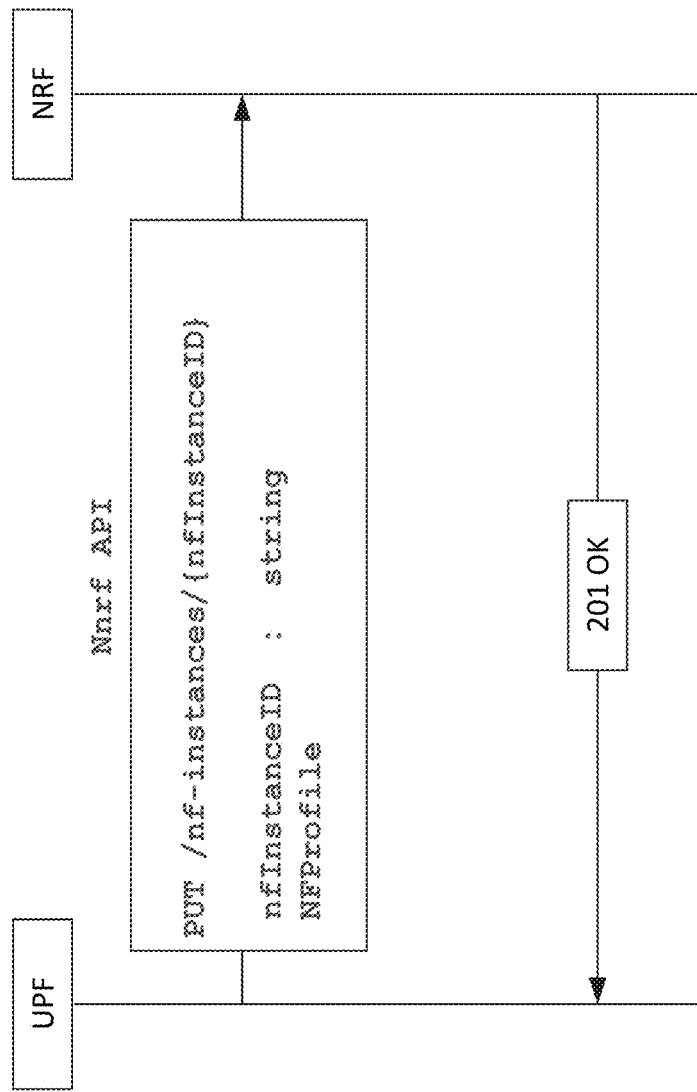
FIG. 2 shows a UPF module registering with the NRF module, using the Nnrf defined API.
Figure 3A:
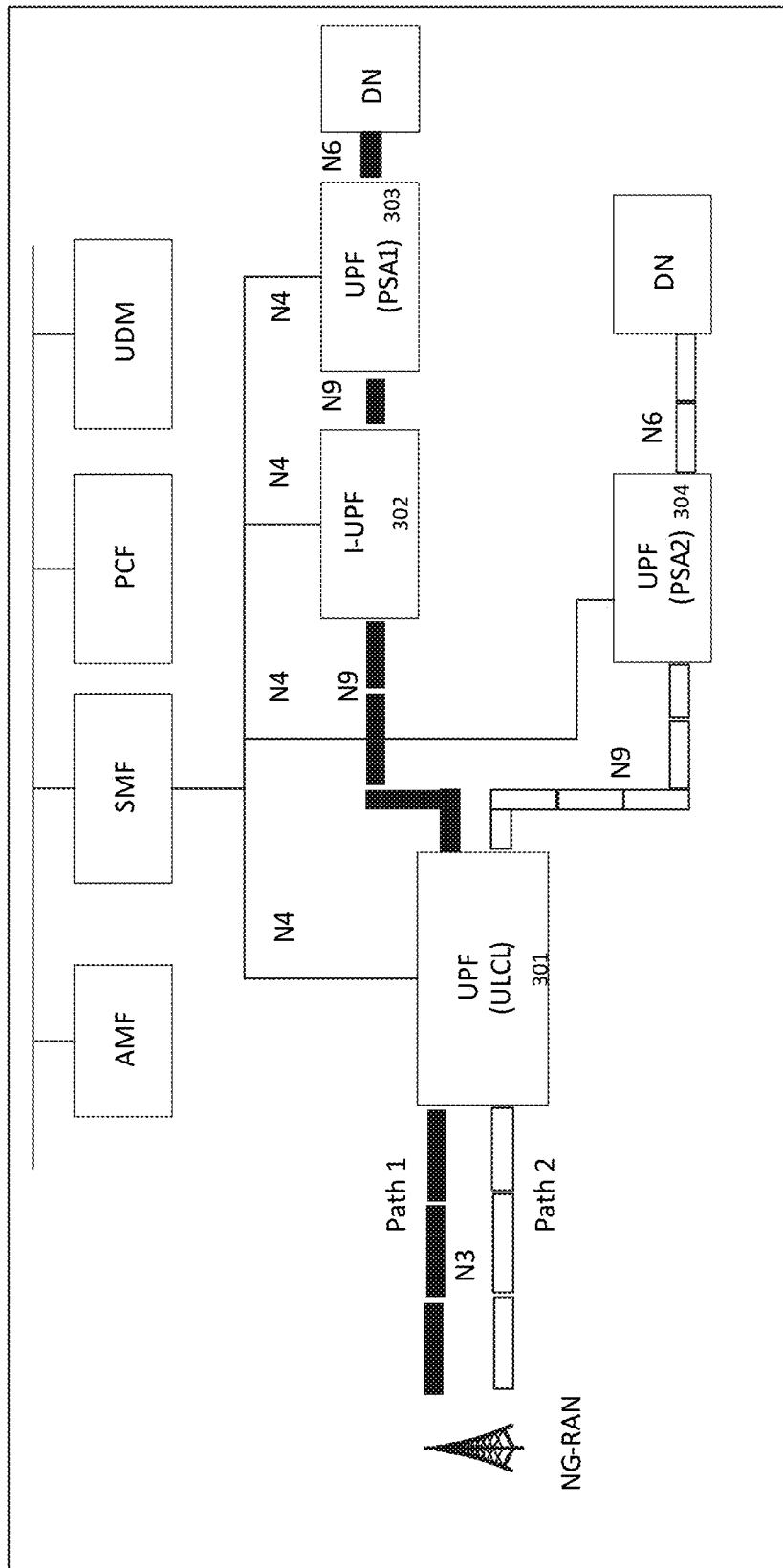
FIGS. 3a-3e show five different example network topologies of the UPF.
Figure 3B:
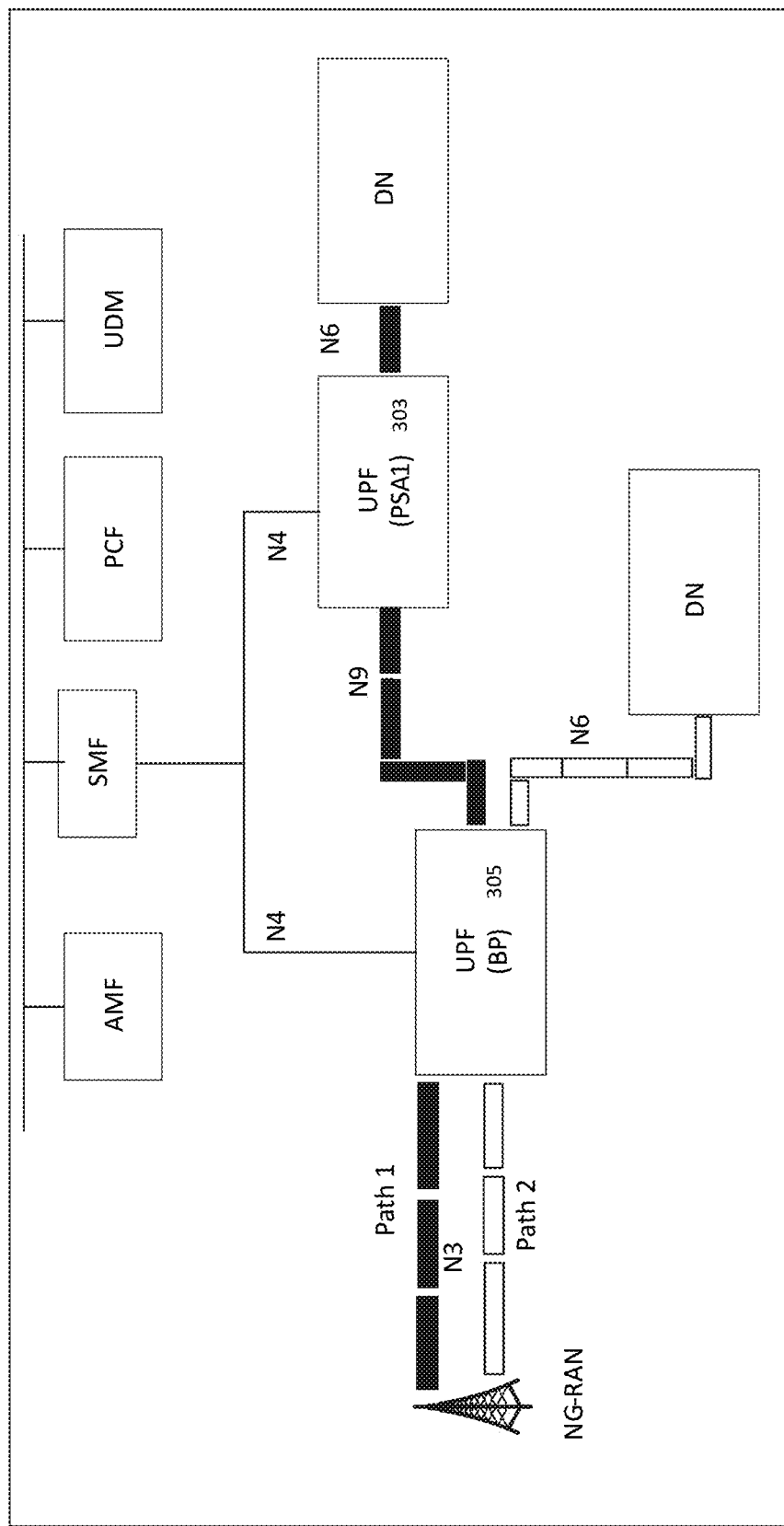

FIGS. 3a-3e show five different example network topologies of the UPF of the present disclosure. The first example topology illustrated in FIG. 3a shows a multiple PDU session anchor case in non-roaming 5G System architecture for concurrent access to two (e.g., local and central) data networks. There are three UPFs for the path 1 (indicated by black connection blocks), including a ULCL 301, a I-UPF 302 and a PSA (shown as PSA1 303). For path 2 (indicated by white connection blocks), there are two UPFs including ULCL 301 and a PSA (e.g., PSA2 304). The second topology illustrated in FIG. 3b shows a single PDU session option case in a non-roaming 5G System architecture for concurrent access to two (e.g., local and central) data networks. There are two UPFs for the path 1 (indicated by black connection blocks), including a branching point (BP) 305 and a PSA (e.g., PSA1 303). For path 2 (indicated by white connection blocks), there is one UPF (e.g., BP 305 in this example).

Figure 3C:
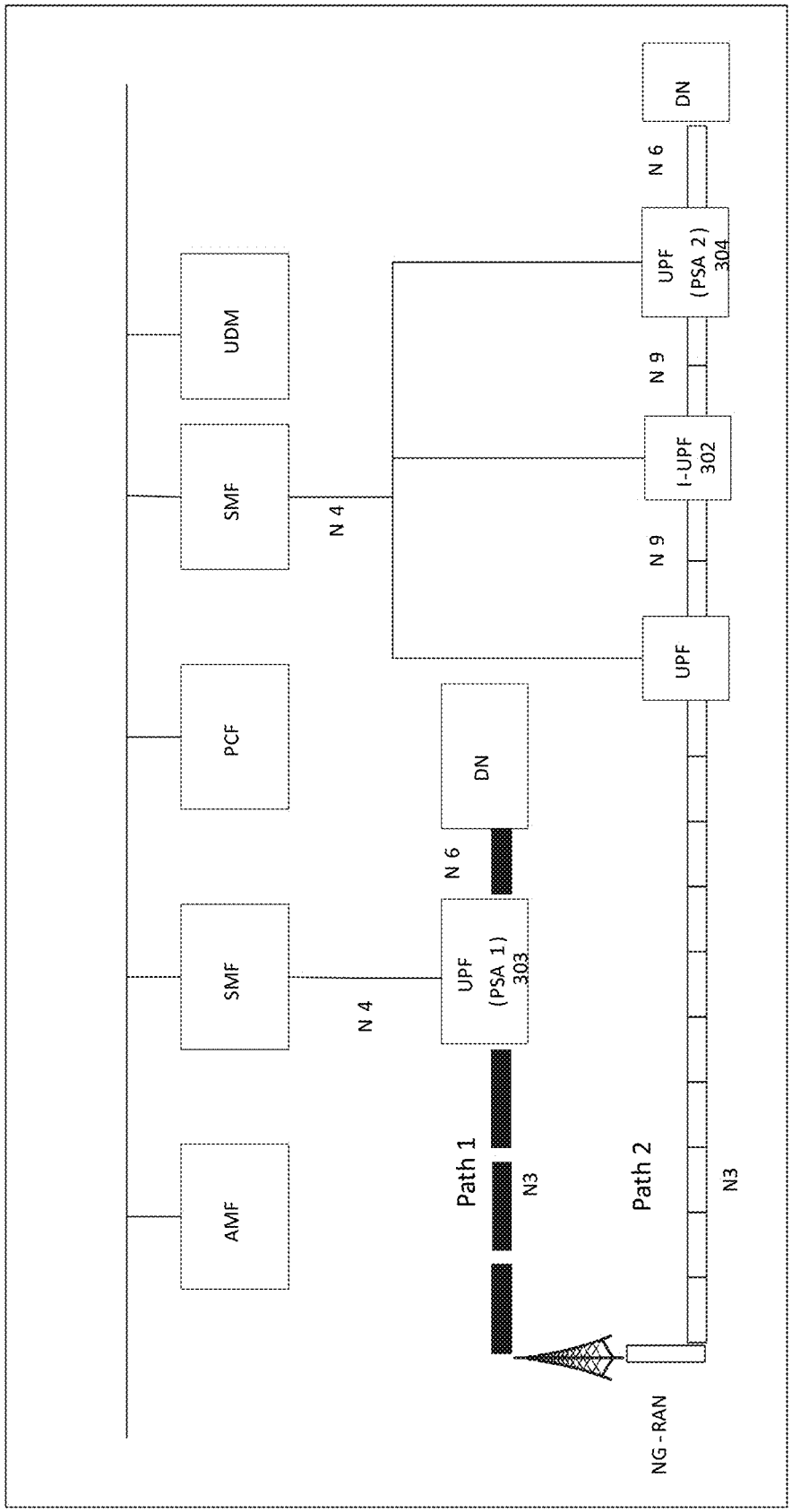
Figure 3D:
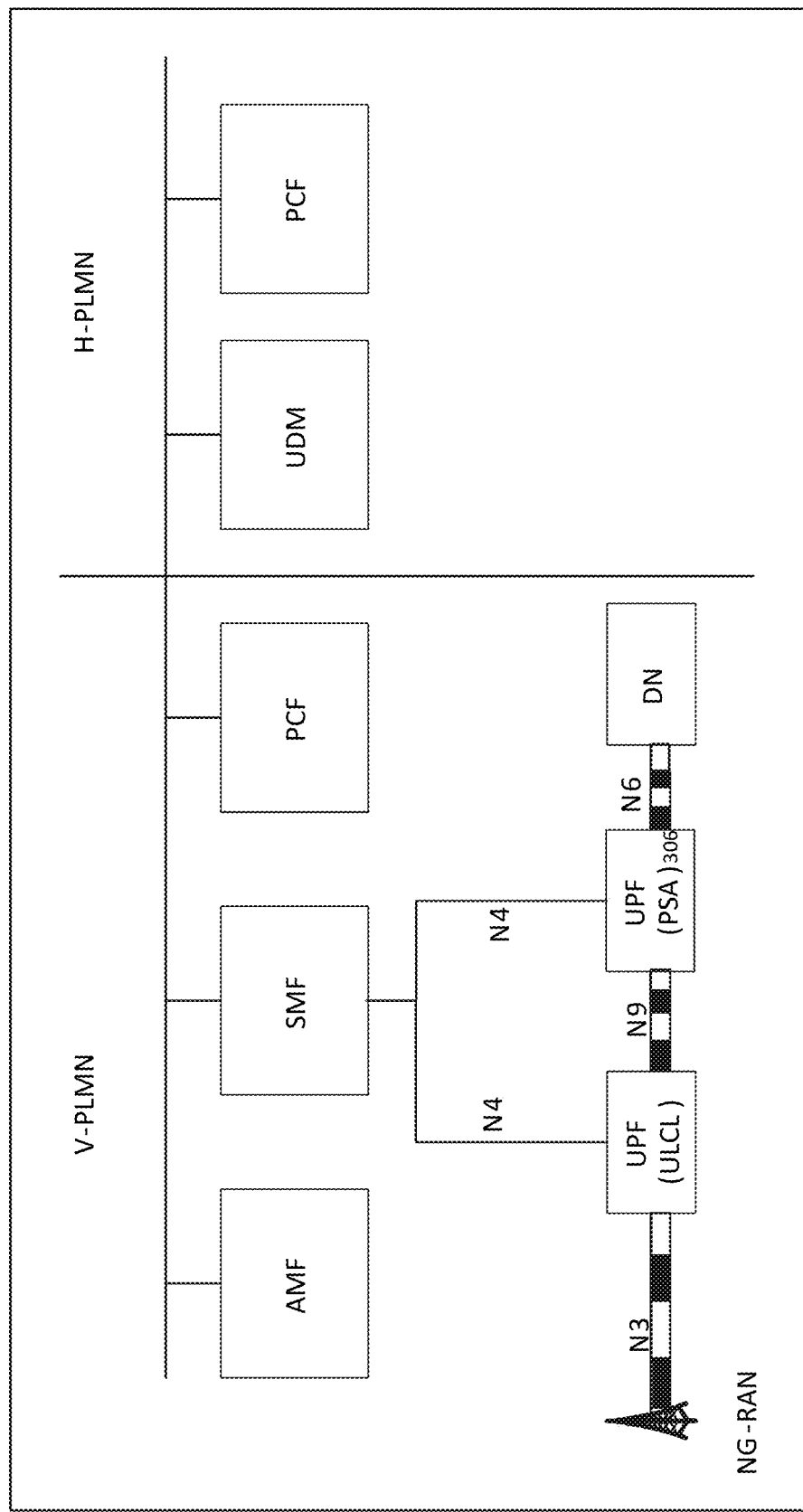
Figure 3E:
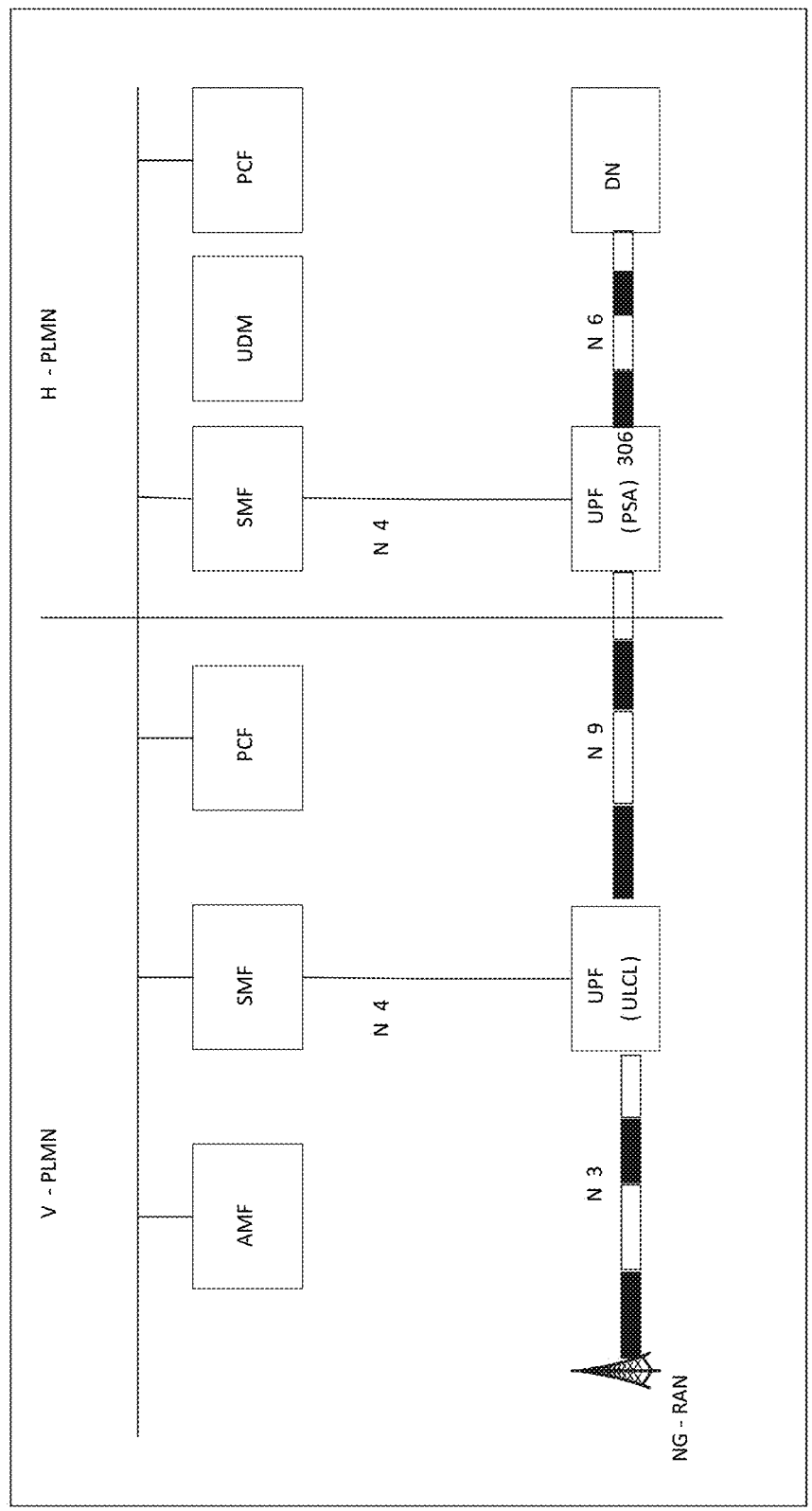

The third topology illustrated in FIG. 3c shows a non-roaming 5G System architecture for Multiple PDU Session option. There is one UPF shown as PSA1 303 for path 1 (indicated by black connection blocks). For path 2 (indicated by white connection blocks), there are three UPF, including an I-UPF 302 and a PSA (shown as PSA2 304). The fourth topology illustrated in FIG. 3d shows a roaming 5G System architecture for local breakout scenario. In this scenario, there is a single PSA 306, through which all the data is passing. The fifth topology illustrated in FIG. 3e shows a roaming 5G System architecture for home routed scenario. In this scenario, there is a single PSA 306, through which all the data is passing.

UPF's exact capability, e.g., whether it can function as a BP, ULCL, I-UPF, PSA and/or a combination of two or more of these functions, depends on a number of factors. For example, a UPF in a given topology can be located behind a router that offers Maximum Traffic Unit (MTU), which leads to packet fragmentations, and hence the UPF is not suitable for an I-UPF or PSA, but is suitable for a Branching point, as it can be positioned near to the RAN, as discussed in the previous section. The other nodes, e.g., SMF and the other network slice selection criteria (e.g., SMF can be in different sub-slice of the network than the UPF), are impacted as they are not able to determine the UPF's exact capability or limitations.

For a given PDU session, a UPF can be connected to other UPF(s) that are in different domains and by multiple SMFs. In this case, it is possible that the multiple SMFs are not aware that the dynamic utilization of given resources of a UPF may impact the ongoing PDU session. In addition, the UPF may be suitable for a given role, e.g., an I-UPF, but may not be appropriate for a different role, e.g., BP, due to resource constraints.

Figure 4:
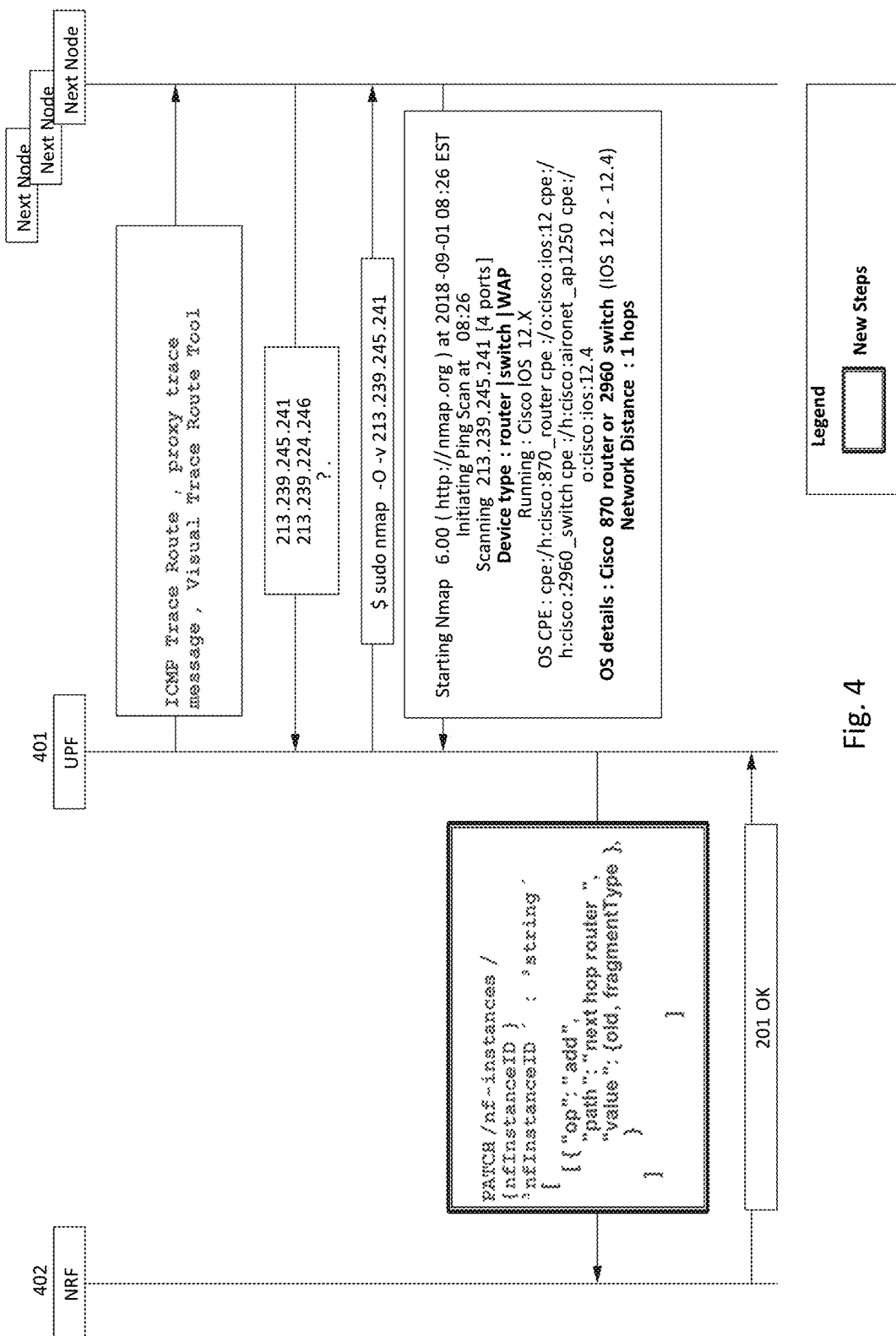
FIG. 4 shows an example of UPF discovering the capability of a given data path.

In order to overcome the above problems, an example UPF according to the present disclosure can perform multiple novel functionalities. One example functionality is a search for, and a discovery of, the next hop (having an associated functional unit, e.g., a router, a gateway, DPI) and/or further hops in the data path of the network, using utilities (e.g., Internet Control Message Protocol (ICMP) traceroute and/or Network Mapper (NMAP) utilities), and determines the capability of the next router and/or other hops in the path. The UPF updates (e.g., using the PATCH command) the Network Repository Function (NRF) with the gathered information, and indicates the UPF's position in the current route. FIG. 4 shows an example of UPF 401 discovering the capability of a given data path. In the example shown in FIG. 4, the UPF 401 discovers that there is a router (e.g., Cisco™ 870) in the next hop, and updates the NRF 402 about the capabilities (e.g., fragmentation abilities) of the router. This path may or may not be suitable for frames of certain types, given the type of router in the path.

Another example functionality of the UPF is to update the NRF about the role(s) the UPF is playing at a given time, e.g., I-UPF, BP, ULCL and/or PSA. FIG. 5 shows an example of UPF identifying its current capabilities and updating the NRF. In the example arrangement shown in FIG. 5, UPF (K) 501 is acting as: i) an I-UPF for one PDU Session (linking NG-RAN(A) 502, UPF(J) 503, UPF(K) 501, UPF(PSA1) 504 and DN(Y) 505); ii) a BP for another PDU session (linking NG-RAN(B) 506, UPF(K) 501, UPF (PSA1) 504 and DN(Y) 505); and iii) a PSA for two PDU sessions (one PDU session linking NG-RAN(A) 502, UPF (J) 503, UPF(K) 501 and DN(X) 507, and a second PDU session linking NG-RAN(B) 506, UPF(K) 501 and DN(X) 507). Table 1 below illustrates an example of an NRF updated table for UPF(K) 501 shown in FIG. 5 after the discovering the capability of a given data path and identifying the current capabilities of UPF(K) 501.

TABLE 1

| UPF# | BP | | PSA | | I-UPF | | DPI | | PDU# | Path | | |
| | Max. Allowed | Current | Max. Allowed | Current | Max. Allowed | Current | Max. Allowed | Current | | Hop# | Router | |
| --- | --- | --- | --- | --- | --- | --- | --- | --- | --- | --- | --- | --- |
| UPF(K) | 10 | 1 | 5 | 2 | 15 | 1 | 3 | 0 | 1 | 1 | Fragment, old | ... |
| | | | | | | | | | | 2 | Regular | |
| | | | | | | | | | | 3 | unknown | |
| | | | | | | | | | | ... | ... | |

In the example shown and described here, the UPF updates its capability dynamically. Next time when a Session Management Function (SMF) tries to select a UPF (e.g., for a PDU session modification procedure in which a new UPF is placed in the data path), the SMF will select the UPF which has a suitable capability level and also at a current geographical position for the PDU session, so that fragmentation, etc., can be avoided. An SMF is a network entity that can perform Session Management and UPF selection for a PDU session. An SMF can select a UPF based on, e.g., user location or slice configuration.

As mentioned previously, the UPF can be connected to a number of SMFs which, by themselves, may not be able to determine i) the exact positioning and role of the UPF (e.g., a router in the path), or ii) the current capabilities of the UPF (e.g., due to resource changes occurring dynamically and impacting the capabilities of the UPF). One advantage provided by the example method and apparatus according to the present disclosure is that the SMF is configured and enabled to identify the UPF's capability for a given PDU Session. Another advantage of the example method and apparatus according to the present disclosure is that the selection of a given UPF for non-suitable roles can be prevented, and the UPF can be selected for those role(s) in which the UPF is more capable of, and/or suitable for, at a given time among multiple potential roles (e.g., being more capable of I-UPF, instead of being a PSA and/or other roles). In this manner, the example method and apparatus according to the present disclosure provide the PDU session orchestrator (e.g., SMF) more visibility to orchestrate an optimum user plane resource selection at a given time, i.e., by having the SMF configured to select at least one functional role for the UPF module among a plurality of potential functional roles, and wherein the UPF module is more capable of performing the at least one selected functional role than the remaining ones of the plurality of potential functional roles for a specified PDU session.

One example method of optimizing user plane function (UPF) analysis for 5G Core network operation includes: searching, by a UPF module, for a next hop in a network path within the 5G Core network for a packet data unit (PDU) session, wherein the next hop has an associated functional unit; upon determining the next hop, updating a network repository function (NRF) module, by the UPF module, information about the capabilities of the functional unit associated with the next hop; and updating the NRF module, by the UPF module, about a functional role the UPF module is performing currently. The searching can be performed using at least one network utility tool, e.g., Internet Control Message Protocol (ICMP) trace route and/or Network Mapper (NMAP). The information about the capabilities of the functional unit can include fragmentation abilities. In the example method, the functional unit can be at least one of a router, a gateway and a Deep Packet Inspection (DPI) module.

The above example method can additionally include: determining, by a session management function (SMF) module, using the information available at the NRF module, at least one functional role suitable for the UPF module in a network path for another PDU session. The SMF module can be configured to identify the UPF module's capability for a specified PDU Session. The SMF module can be further configured to select at least one functional role for the UPF module among a plurality of potential functional roles, and wherein the UPF module is more capable of performing the at least one selected functional role than the remaining ones of the plurality of potential functional roles for a specified PDU session.

One example embodiment of a system for optimizing user plane function (UPF) analysis for 5G Core network operation includes: a UPF module configured to search for a next hop in a network path within the 5G Core network for a packet data unit (PDU) session, wherein the next hop has an associated functional unit; and a network repository function (NRF) module configured to be updated by the UPF module upon determining the next hop, wherein the updating comprises i) updating information about the capabilities of the functional unit associated with the next hop, and ii) updating information about a functional role the UPF module is performing currently. The UPF can be configured to perform the search using at least one network utility tool, e.g., Internet Control Message Protocol (ICMP) traceroute and/or Network Mapper (NMAP). The information about the capabilities of the functional unit can include fragmentation abilities. The functional unit can be at least one of a router, a gateway and a Deep Packet Inspection (DPI) module.

The above example system can additionally include a session management function (SMF) module configured to determine, using the information available at the NRF module, at least one functional role suitable for the UPF module in a network path for another PDU session. The SMF module can be configured to identify the UPF module's capability for a specified PDU Session. The SMF module can be further configured to select at least one functional role for the UPF module among a plurality of potential functional roles, and wherein the UPF module is more capable of performing the at least one selected functional role than the remaining ones of the plurality of potential functional roles for a specified PDU session.

The techniques, methods and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure.

Although the present disclosure utilizes 5G Core network operation as an example, the present disclosure is intended to encompass, and is fully applicable to, operations of other types of mobile networks, e.g., in a Long Term Evolution (LTE) network, as a Packet Data Network Gateway (PGW), or in a 3G network, as a Gateway GPRS Support Node (GGSN). These examples are not limiting. In addition, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

Glossary of Terms

5GC $5^{th}$ Generation Core Network
6GS $5^{th}$ Generation System

AF Application Function
AMF Access and Mobility Management Function
AUSF Authentication Server Function
BP Branching Point
DN Data Network
DPI Deep Packet Inspection
GGSN Gateway GPRS Support Node
GPRS General Packet Radio Service
ICMP Internet Control Message Protocol
I-UPF Intermediate User Plane Function
LMF Location Management Function
LTE Long Term Evolution
MTU Maximum Traffic Unit
NEF Network Exposure Function
NF Network Function
NG-RAN Next Generation Radio Access Network
NMAP Network Mapper
Nnrf Service-based interface exhibited by NRF
NRF Network Repository Function
NSSF Network Slice Selection Function
PCF Policy Control Function
PDU Packet Data Unit
PGW Packet Data Network Gateway
PSA Packet Data Unit (PDU) Session Anchor
RAN Radio Access Network
SMF Session Management Function
UDM Unified Data Management
UE User Equipment
UL Uplink
ULCL Uplink Classifier
UPF User Plane Function

What is claimed is:

1. A system for optimizing user plane function (UPF) analysis for 5G Core network operation, comprising:
    a UPF module configured as a first processor executing a first computer program to search for a next hop in a network path within the 5G Core network for a packet data unit (PDU) session, wherein the next hop has an associated functional unit; and
    a network repository function (NRF) module configured as a second processor executing a second computer program, wherein said NRF module is configured to be updated by the UPF module upon determining the next hop, and wherein the updating comprises i) updating information about the capabilities of the functional unit associated with the next hop, and ii) updating information about a functional role the UPF module is performing currently.

2. The system of claim 1, wherein the UPF is configured to perform the search using at least one network utility tool.

3. The system of claim 2, wherein the at least one network utility tool is at least one of Internet Control Message Protocol (ICMP) traceroute and Network Mapper (NMAP).

4. The system of claim 1, wherein the information about the capabilities of the functional unit includes fragmentation abilities.

5. The system of claim 1, wherein the functional unit is at least one of a router, a gateway and a Deep Packet Inspection (DPI) module.

6. The system of claim 1, further comprising:
    a session management function (SMF) module configured as a third processor executing a third computer program to determine, using the information available at the NRF module, at least one functional role suitable for the UPF module in a network path for another PDU session.

7. The system of claim 6, wherein the SMF module is configured to identify the UPF module's capability for a specified PDU Session.

8. The system of claim 6, wherein the SMF module is configured to select at least one functional role for the UPF module among a plurality of potential functional roles, and wherein the UPF module is more capable of performing the at least one selected functional role than the remaining ones of the plurality of potential functional roles for a specified PDU session.

9. The system of claim 6, wherein the information about the capabilities of the functional unit includes fragmentation abilities.

10. The system of claim 6, wherein the functional unit is at least one of a router, a gateway and a Deep Packet Inspection (DPI) module.

* * * * *